(12) United States Patent
Matsuura et al.

(10) Patent No.: US 6,332,357 B1
(45) Date of Patent: Dec. 25, 2001

(54) SUCTION-TYPE LIQUID MEASURING DEVICE AND METHOD OF FEEDING MOLTEN FLUID UTILIZING SAME

(75) Inventors: Makoto Matsuura; Hiroshi Masaki; Shinya Naitou; Hiroshi Yamagata, all of Hiroshima (JP)

(73) Assignees: Hiroshima Aluminum Industry Co., Ltd., Hisoshima; Hanano Corporation, Kobe, both of (JP)

( * ) Notice: Subject to any disclaimer, the term of this patent is extended or adjusted under 35 U.S.C. 154(b) by 0 days.

(21) Appl. No.: 09/262,301

(22) Filed: Mar. 4, 1999

(51) Int. Cl.[7] .................. G01F 23/00; B22D 18/06; B22D 41/00
(52) U.S. Cl. .............. 73/303; 164/256; 164/335
(58) Field of Search ............... 73/864.35, 303; 164/256, 335, 257, 253

(56) References Cited

U.S. PATENT DOCUMENTS 4,471,831 * 9/1984 Ray ........................... 164/508
4,595,044 * 6/1986 Caugherty ..................... 164/337

* cited by examiner

Primary Examiner—Hezron Williams
Assistant Examiner—Katina Wilson
(74) Attorney, Agent, or Firm—Crowell & Moring LLP

(57) ABSTRACT

An inlet/outlet pipe extending downward from a bottom face of a body for a ladle is bent at its tip end into an S-shape in an intermediate portion of the pipe, and its tip end is located at a level higher than that of the bent portion. When a negative pressure in the ladle body is increased, a height of range of a molten metal is increased before and after an occurrence of disturbance in the ladle body, so that the negative pressure in the ladle body is made balance with a weight of the molten metal. Thereby, the molten metal is measured and held at a constant volume in the ladle body.

8 Claims, 3 Drawing Sheets

SUCTION-TYPE LIQUID MEASURING DEVICE AND METHOD OF FEEDING MOLTEN FLUID UTILIZING SAME

BACKGROUND OF THE INVENTION

This invention relates to an improvement in a suction-type liquid measuring equipment, and especially to a structure of inlet/outlet for allowing a liquid to come in and out.

In case for example when casting a cast product, a molten metal of such as aluminum alloy is conventionally filled in a cavity of metal mold. For this purpose, there is such a method that a molten metal accumulated in a metal melting/holding furnace is drawn up by a ladle and filled in the cavity of metal mold. (Refer to Published Japanese Utility Model Application (KOKAI) No. 3-111447 and Published Japanese Patent Application (KOKAI) No. 4-9262, for example.)

There is another method in which a ladle provided with an intake port provided at its bottom face is dipped in a molten metal to take the molten metal in the ladle, so that the ladle is moved to the metal mold under a condition where the above intake port is closed by a stopper. Then, the stopper is removed to fill the molten metal into the cavity of metal mold.

There is further another method, as shown in FIG. 6, in which a sealed-type ladle A sealed at its top opened portion of the ladle body B with a cover K is used, and an inlet/outlet pipe C protruding down straight from a bottom face of the ladle body B of the ladle A is dipped in the molten metal. Under this state, an inside of the ladle body B is evacuated and brought to a negative pressure by way of a suction pipe D protruding upward from the cover K, so as to suck a molten metal E from the inlet/outlet pipe C. Thus, the negative pressure in the ladle body B is made balance with a gravity of the molten metal E, and the molten metal E is measured and held at a constant volume in the ladle body B. Thereafter, the ladle A is transferred to the metal mold and the negative pressure in the ladle body B is released, so as to fill the molten metal E in the cavity of metal mold.

In the above-mentioned first and second methods, however, the holding volume of molten metal differs depending on the way of dipping of the ladle. Therefore, the molten metal can not be filled in the cavity of metal mold neither too much nor too less.

In the third method, the holding volume of molten metal can be made constant by controlling the negative pressure in the ladle body B to a specified value. However, when the negative pressure in the ladle body B is fluctuated due to an occurrence of disturbance, the balance between the negative pressure in the ladle body B and the gravity of the molten metal E is destroyed, so that the molten metal E can not be measured and held in the ladle body B at a constant volume and the molten metal E becomes unable to be fed in the cavity of metal mold neither too much nor too less as in case of the foregoing two examples. Especially, in case when the negative pressure in the ladle body B increases, a molten metal level forming an upper surface of the molten metal E rises up to a level higher than that of the molten metal shown at a left side of FIG. 6, which existed before the disturbance occurred. (A rising-up height is shown using a symbol H at right side of FIG. 6.) A lower surface of the molten metal E rising up accompanied by the upper surface also rises up to a level higher than that of the molten metal shown at left side of FIG. 6, which existed before the disturbance occurred. (A rising-up height is shown using a symbol I at right side of FIG. 6). However, since the inside diameter of the ladle body B is by far larger than that of the inlet/outlet pipe C, a rising-up height of the molten metal (upper surface) is smaller than that of the lower surface and the height of range of the molten metal E becomes small by a height (I-H) as compared with the case before the occurrence of disturbance. The height of range of the molten metal E existing before the occurrence of disturbance is shown at left side of FIG. 6 using a symbol F, and the height of range of the molten metal E existing after the occurrence of disturbance is shown at right side of FIG. 6 using a symbol G. As the result, an unbalance between the negative pressure in the ladle body B and the gravity of the molten metal E enhanced. Accordingly, air is sucked from the inlet/outlet pipe C so that air bubbles J occur and a trouble such as a formation of oxidized film is brought about.

Measuring a liquid with good precision is utilized and applied not only to the case where the molten metal is measured in the casting work, but also to all cases where liquids other than the molten metal are measured.

This invention is made in consideration of the above point, and an object of it is to always measure and hold securely a liquid such as the molten metal at a constant volume in a vessel such as the ladle etc., without being affected by an increase in a negative pressure (suction force) caused by an occurrence of disturbance.

SUMMARY OF THE INVENTION

In order to accomplish the above-mentioned object, this invention is characterized in that a shape of pipe is devised, which forms an inlet/outlet pipe for allowing a liquid to come in and out.

In concrete, this invention is intended to provide a suction-type liquid measuring equipment having a vessel provided with a suction pipe extending from its top end side and an inlet/outlet pipe protruding downward from its bottom end side, and a negative pressure means connected to the suction pipe of the vessel; in which a pressure in the vessel is brought to a negative one to suck a liquid from the inlet/outlet pipe by operating the negative pressure means, so that the liquid is measured and held at a constant volume in the vessel using a balance between the negative pressure in the vessel with a gravity of the liquid. The following solution means are utilized.

A first solution means of this invention is characterized in that a height of range of the liquid is increased in the vessel when the negative pressure is increased in the vessel.

A second solution means of this invention is characterized in that, as mentioned in the first solution means, the inlet/outlet pipe is bent at its intermediate portion and its tip end side from the bent portion is not located at least at a level lower than a bent portion.

A third solution means of this invention is characterized in that, as mentioned in the first solution means, an inside diameter of the inlet/outlet pipe is made larger than that of the suction pipe.

A fourth solution means of this invention is characterized in that, as mentioned in the second solution means, a tip end side from the bent portion of the inlet/outlet pipe is bent approximately into an S-shape and located at a level higher than that of the bent portion.

A fifth solution means of this invention is characterized in that, as mentioned in the second solution means, a tip end side from the bent portion of the inlet/outlet pipe is bent approximately into a convex-shape and located at a level higher than that of the bent portion.

A sixth solution means of this invention is characterized in that, as mentioned in the second solution means, a tip end side from the bent portion of the inlet/outlet pipe is bent at right angle approximately into a straight line and located at a level flush with the bent portion.

According to the foregoing constructions, in the first through sixth solution means, the vessel inside is brought to the negative pressure by operating the negative pressure means and the liquid is sucked from the inlet/outlet pipe, so that the liquid is measured and held at a constant volume in the vessel using the balance between the negative pressure in the vessel with the gravity of the liquid.

When the suction force of the negative pressure means is increased by the occurrence of disturbance in this instance, the negative pressure in the vessel increases and an upper surface of the liquid rises up in the vessel to a level higher than that existing before the occurrence of disturbance. However, a lower surface of the liquid sinks down to a level lower than that existing before the occurrence of disturbance, in the fourth and fifth solution means; it remains at the level flush with that existing before the occurrence of disturbance, in the sixth solution means; and a degree of rising-up of the lower surface is smaller than that of the liquid upper surface and the height of range of the liquid rises up to a level higher than that existing before the occurrence of disturbance, in the third solution means.

Thereby, the balance between the negative pressure in the vessel and the gravity of liquid is recovered and stabilized without being destroyed, and the liquid is always measured and held securely at a constant volume in the vessel, so that the liquid is fed to an aimed spot neither too much nor too less. In addition, sucking of air can be avoided, which is caused by destruction of the balance between the negative pressure in the vessel and the gravity of liquid. Therefore, in case where the liquid comprises molten metal, air bubbles causing the oxidized film are not produced.

DETAILED DESCRIPTION OF THE PREFERRED EMBODIMENTS

The mode for carrying out the invention will be described hereunder with reference to attached drawings.

Figure 1:
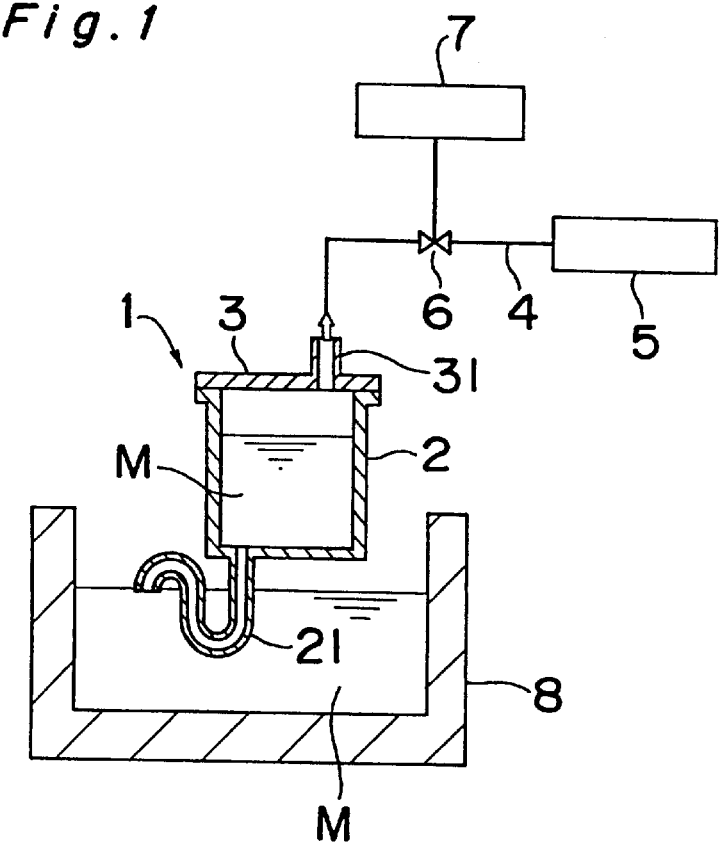
FIG. 1 is a structural view of an automatic molten metal feeding equipment for serving as the suction-type liquid measuring equipment in relation to the mode of this invention.
Figure 2:
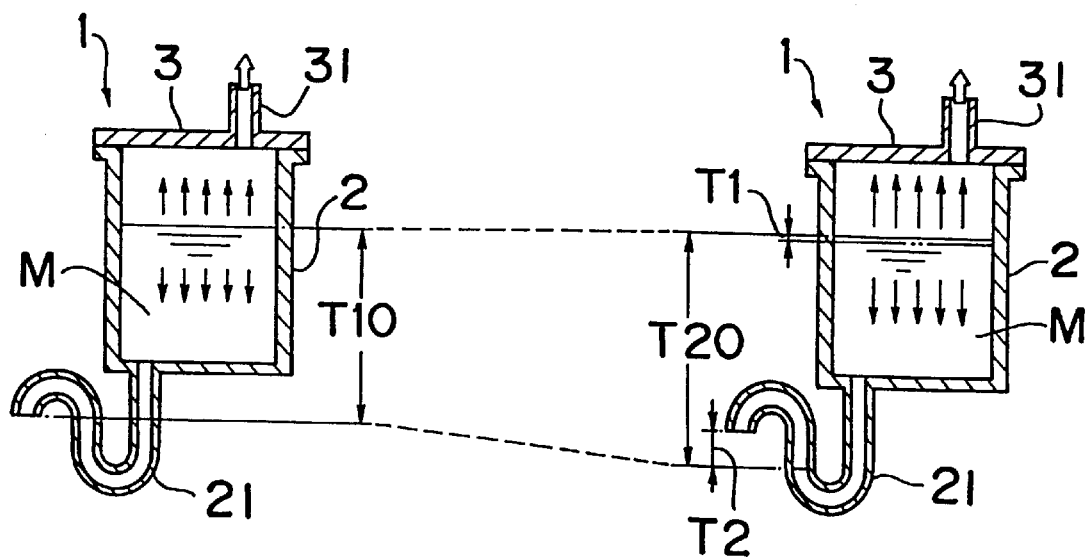
FIG. 2 is an explanatory view showing holding states of molten metal before and after occurrence of disturbance in the ladle of this invention.

FIG. 1 shows an automatic molten metal feeding equipment for serving as a suction-type liquid measuring equipment in relation to the mode for carrying out this invention. In the figure, 1 is a sealed-type ladle for serving as a vessel. The ladle 1 has a ladle body 2 formed into a cylindrical shape opened at its upper part and including a bottom closure at its lower part, and an upper opening of the ladle body 2 is closed with a cover 3. A suction pipe 31 protrudes upward from a top end side of the ladle 1, i.e. the cover 3, and a vacuum pump 5 serving as the negative pressure means is connected through a piping 4 to the suction pipe 31. A shut-off valve 6 is installed in an intermediate portion of the piping 4, and the shut-off valve 6 is controlled by a controller 7. Thus, the controller 7 controls the shut-off valve 6 to evacuate the ladle body 2, so that an inside pressure of the ladle body 2 can be controlled to a specified negative pressure.

Figure 3:
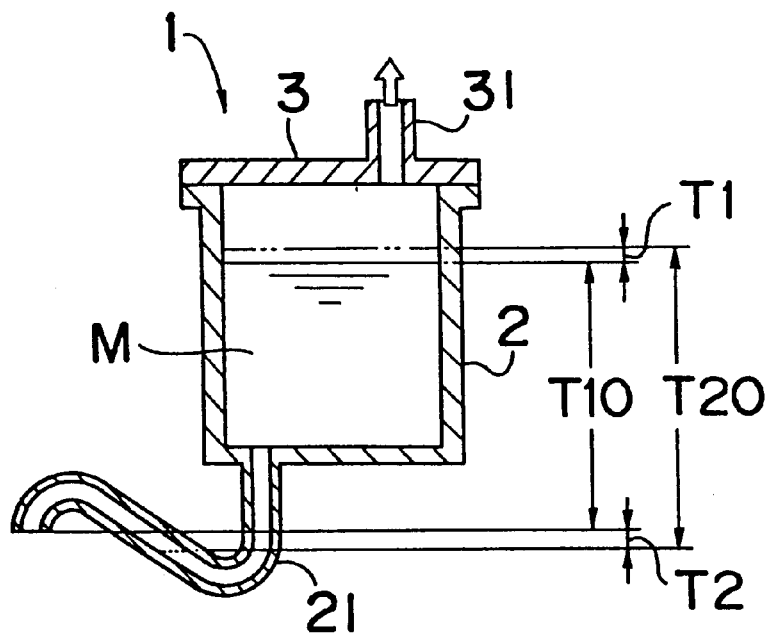
FIG. 3 is a sectional view of a ladle for an alternative example 1.
Figure 4:
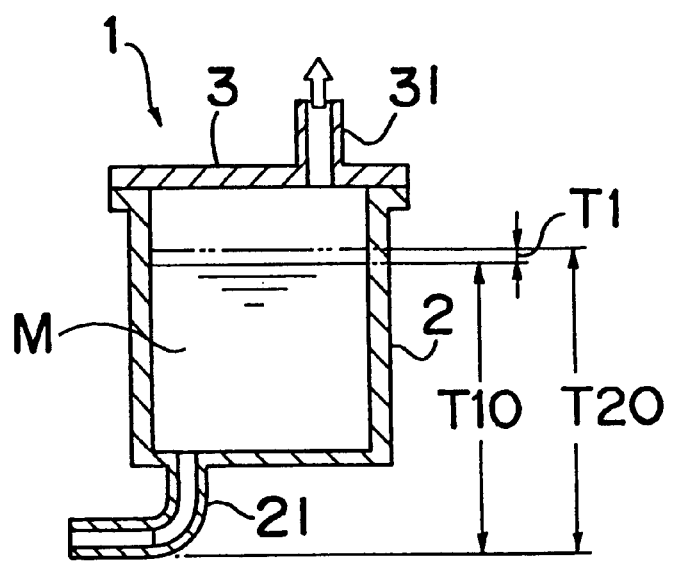
FIG. 4 is a sectional view of a ladle for an alternative example 2.

An inlet/outlet pipe 21 protrudes downward from the bottom end side of the ladle 1, i.e. the bottom face of the ladle body 2. The inlet/outlet pipe 21 is bent at its intermediate portion and its tip end side from the bent portion is bent approximately into an S-shape and located at a level higher than the bent portion. The tip end side from the bent portion of the inlet/outlet pipe 21 is not necessarily formed approximately into the S-shape but may be formed into any shape, provided that the tip end is located at a level not lower than the level of the bent portion. The tip end side from the bent portion of the inlet/outlet pipe 21 may be bent approximately into a convex-shape so that it is located at a level higher than the bent portion, as shown in FIG. 3 for an alternate example 1. The tip end side from the bent portion of the inlet/outlet pipe 21 may be bent at right angle approximately into a straight line so that it is located at a level flush with the bent portion, as shown in FIG. 4 for an alternate example 2.

When feeding the molten metal, the ladle 1 is transferred to a melting/holding furnace 8 and the inlet/outlet pipe 21 is dipped in the molten metal M comprising such as aluminum alloy etc. forming the liquid accumulated in the melting/holding furnace 8. Under this state, the vacuum pump 5 is operated and the shut-off valve 6 is controlled by the controller 7. Thereby, the inside of the ladle body 2 of the ladle 1 is brought into a negative pressure to suck the molten metal M from the inlet/outlet pipe 21, so that the molten metal M is measured and held at a constant volume by using the balance between the negative pressure in the vessel and the gravity of the molten metal M. Thereafter, the ladle 1 is transferred to the metal mold and the negative pressure in the ladle body 2 is released through the control of the controller 7, thereby the molten metal M is filled in the cavity of the metal mold. The tip end side from the bent portion of the inlet/outlet pipe 21 is formed into the shape as mentioned above, so that the height of range of the molten metal M is devised to increase in the ladle body 2 when the negative pressure in the ladle 2 increases due to the occurrence of disturbance.

Figure 5:
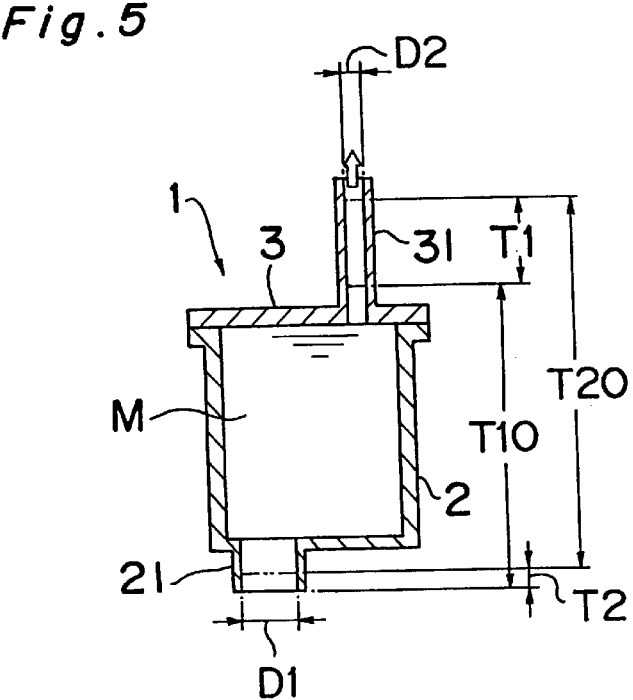
FIG. 5 is a sectional view of a ladle for an alternative example 3.
Figure 6:
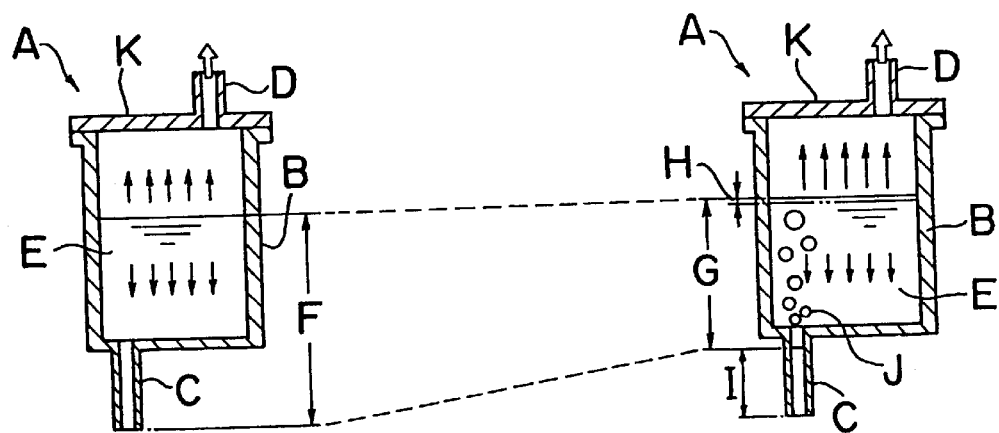
FIG. 6 is an explanatory view showing holding states of molten metal before and after occurrence of disturbance in a conventional ladle.

For solution means against the disturbance, in addition to the above three solution means, a means will be also usable to accomplish the object, wherein an inside diameter D1 of the inlet/outlet pipe 21 is made larger than an inside diameter D2 of the suction pipe 31, as shown in FIG. 5 for an alternate example 3. In this case, it is required to previously suck the molten metal M up to a position of the suction pipe 31.

Although the negative pressure in the ladle body 2 is controlled to a specified pressure by the controller 7 to maintain the molten metal holding volume at a constant value in the ladle 1, there may be a case where the suction force of the vacuum pump 5 increases due to the occurrence of disturbance. In such a case, the negative pressure will increase in the ladle body 2 so that the molten metal level forming the upper surface of the molten metal M in the ladle body 2 will come higher than the liquid surface level existing before the occurrence of disturbance as shown by FIG. 2 and FIG. 3 through FIG. 5. (Rising-up heights are shown by symbols T1 in FIG. 2 and FIG. 3 through FIG. 5.) However, the lower surface of the molten metal M will come lower than the liquid surface level existing before the occurrence of disturbance, in the mode of this invention and the alternative example 1 (lowering heights are shown by symbols T2 in FIG. 2 and FIG. 3). In the alternative example 2, the lower surface of the molten metal M is flush with the liquid surface level existing before the occurrence of disturbance. In the alternative example 3, the degree of rising-up for the lower surface of the molten metal M is smaller than that of the upper surface of the molten metal M. (Rising-up height is shown by symbols T2 in FIG. 5.) Consequently, the height of range of the molten metal M in the ladle body 2 will increase as compared with the height existing before the occurrence of disturbance, by an amount (T1+T2) in the mode of this invention and the alternative example 1 (FIG. 2 and FIG. 3), by an amount (T1) in the alternative example 2 (FIG. 4), and by an amount (T1−T2) in the alternative example 3 (FIG. 5). The height of range of the molten metal M existing before the occurrence of disturbance is shown by a symbol T10, and the height of range of the molten metal M existing after the occurrence of disturbance is shown by a symbol T20, in FIG. 2 and FIG. 3 through FIG. 5, respectively.

Thereby, the balance between the negative pressure in the ladle body 2 and the gravity of the molten metal M can be recovered and stabilized, and the molten metal M can always be measured and held securely at a constant volume in the ladle body 2 to be filled in the cavity of metal mold. Further, since the balance between the negative pressure in the ladle body 2 and the gravity of the molten metal M is not destroyed, the generation of bubble due to suction of air can be prevented so that the formation of oxidized film can be avoided.

In the above descriptions, the tip end side of the inlet/outlet pipe 21 is shown in such forms that it is bent approximately into the S-shape, that it is bent approximately into the convex-shape, and that it is bent at right angle approximately into the straight line. However, the tip end side of the pipe 21 may be formed into any shape other than these forms, provided that the inlet/outlet pipe 21 is bent at its intermediate portion and its tip end side from the bent portion is not located at least at a level not lower than the bent portion.

In the above description, the suction pipe 31 is protruded upward from the cover 3. However, it may be protruded from a side near to the top end of the ladle body 2 in a horizontal direction, and the inlet/outlet pipe 21 may be protruded downward from a side near to the bottom end of the ladle body 2, instead of being protruded downward from the bottom face of the ladle body 2.

In the above description, the automatic molten metal feeding equipment is shown for serving as the suction-type liquid measuring equipment, for example. However, any kind of equipment will do provided that the equipment is one which is required to measure the liquid at a constant volume through means of suction.

According to this invention, the tip end side of the inlet/outlet pipe protruding downward from the bottom end side of the vessel is bent into the approximately S-shape or bent into the approximately convex-shape to be located at the level higher than the bent portion, or bent at right angle approximately into the straight line to be located at the level flush with the bent portion, or the inside diameter of the inlet/outlet pipe is made larger than that of the suction pipe. Therefore, when the negative pressure in the vessel increases, the height of liquid rises up higher than the level existing before the occurrence of disturbance to recover the balance between the negative pressure in the vessel and the gravity of the liquid, and the liquid can always be measure and held securely at a constant volume in the vessel and can be fed to the aimed spot neither too much nor too less. The suction of air, which is caused by the destruction of balance between the negative pressure in the vessel and the gravity of the liquid, can be prevented so that the generation of bubble can be avoided which will cause the oxidized film in case when the liquid is the molten metal.

What is claimed is:

1. A suction-type liquid measuring device comprising:
   a vessel provided with a suction pipe extending from its top end and an inlet/outlet pipe protruding downward from its bottom end;
   means for creating a negative pressure connected to the suction pipe of the vessel;
   wherein the inlet/outlet pipe is bent at a right angle at an intermediate portion thereof such that the distal end portion of the inlet/outlet pipe extends along a straight line and is located at a level flush with the bent portion;
   whereby a pressure in the vessel is capable of being brought to a negative pressure to thereby suck a liquid from the inlet/outlet pipe so that the liquid is measured and held at a constant volume in the vessel using a balance between the negative pressure in the vessel with gravitational pull on the liquid; and
   wherein the height of the liquid is capable of being increased in the vessel when the negative pressure is increased in the vessel.

2. A suction-type liquid measuring device comprising:
   a ladle;
   a suction pipe in fluid communication with the ladle at one end and a vacuum-producing mechanism at another end; and
   an inlet/outlet pipe in fluid communication with the ladle at one end and having a tip end at its other end;
   wherein the vacuum-producing mechanism is configured to produce a particular negative pressure such that a measured volume of fluid is sucked into and held within the device by way of a balance between the negative pressure and the weight of the volume of fluid, the held volume of fluid having a height defined by the distance between an upper surface of the held fluid and a lower surface of the held fluid;

wherein the inlet/outlet pipe is formed in a shape such that when the particular negative pressure is increased, the height of the fluid is also increased.

3. The suction-type liquid measuring device according to claim 2, wherein the shape of the inlet/outlet pipe comprises a bend at an intermediate portion of the pipe, the tip end of the pipe being located at least at a height of the bend.

4. The suction-type liquid measuring device according to claim 3, wherein a portion of the inlet/outlet pipe extending from the bend to the tip end has substantially an S-shape and is situated higher than the height of the bend.

5. The suction-type liquid measuring device according to claim 3, wherein a portion of the inlet/outlet pipe extending from the bend to the tip end has substantially a convex-shape and is situated higher than the height of the bend.

6. The suction-type liquid measuring device according to claim 2, wherein an inside diameter of the inlet/outlet pipe is larger than an inside diameter of the suction pipe.

7. The suction-type liquid measuring device according to claim 3, wherein the tip end of the inlet/outlet pipe is substantially straight and arranged to extend substantially perpendicularly to the rest of the inlet/outlet pipe by way of the bend at the intermediate portion of the inlet/outlet pipe.

8. A method of feeding molten fluid utilizing the suction-type liquid measuring device of claim 2, comprising:

dipping the inlet/outlet pipe into a molten fluid;

operating the vacuum-producing mechanism to produce the particular negative pressure within the device and suck the measured volume of the molten fluid into the device;

transferring the device to within a proximity of a mold; and releasing the negative pressure within the device to thereby fill the mold with the molten fluid.

* * * * *